United States Patent [19]

Daughton

[11] 4,387,025
[45] Jun. 7, 1983

[54] PURIFYING CONTAMINATED WATER

[75] Inventor: Christian G. Daughton, San Pablo, Calif.

[73] Assignee: The United States of America as represented by the United States Department of Energy, Washington, D.C.

[21] Appl. No.: 315,378

[22] Filed: Oct. 27, 1981

[51] Int. Cl.$^3$ .............................................. C02F 1/28
[52] U.S. Cl. .................................. 210/612; 210/631; 210/679; 210/691; 210/908
[58] Field of Search ............... 210/603, 612, 631, 679, 210/691, 908, 909

[56] References Cited

U.S. PATENT DOCUMENTS

| | | | |
|---|---|---|---|
| 1,676,151 | 7/1928 | McKee | 210/691 |
| 3,676,357 | 7/1972 | Cinti et al. | 210/691 X |
| 4,133,742 | 1/1979 | Hill | 210/691 X |
| 4,160,729 | 7/1979 | Wilcox | 210/691 |

OTHER PUBLICATIONS

*News Quarterly*, vol. XXX, No. 4, 10/1980, published by Sanitary Engineering Research Laboratory of University of California, Berkeley.

*Primary Examiner*—Thomas G. Wyse
*Attorney, Agent, or Firm*—Harold M. Dixon; Roger S. Gaither; Richard G. Besha

[57] ABSTRACT

Process for removing biorefractory compounds from contaminated water (e.g., oil shale retort waste-water) by contacting same with fragmented raw oil shale. Biorefractory removal is enhanced by preactivating the oil shale with at least one member of the group of carboxylic, acids, alcohols, aldehydes, ketones, ethers, amines, amides, sulfoxides, mixed ether-esters and nitriles. Further purification is obtained by stripping, followed by biodegradation and removal of the cells.

18 Claims, No Drawings

PURIFYING CONTAMINATED WATER

BACKGROUND OF THE INVENTION

The invention disclosed herein arose at the Lawrence Berkeley Laboratory in the course of, or under Contract No. W-7405-ENG-48 between the U.S. Department of Energy and the University of California.

The present invention relates indirectly to shale oil recovery and more directly to the removal of biorefractory compounds from water containing same, such as oil shale retort wastewater. Still more particularly, this invention relates to a process for the purification of oil shale wastewater by treatment with raw oil shale.

The diminishing supply of petroleum due to the depletion of many known oil reservoirs and the reduced number of accessible potential oil-bearing reservoirs is forcing the development of alternate sources of petroliferous deposits. One of the more abundant recoverable such deposits is oil shale. Oil shale is a composite of a solid, organic petroliferous material or kerogen in an inorganic matrix which is shale or marlstone. Because the kerogen is a solid imbedded in a relatively impervious, dense rock or tight formation, thermal fluidization by retorting has been the generally more successful manner of separating and recovery thereof. There are two general methods of retorting oil shale, surface retorting and in situ retorting. In surface retorting, the oil shale is mined and retorted at the surface in a "vessel". In situ retorting involves heating oil shale in-place. More often and preferably the in-place retorting is conducted by a modified in situ process which involves mining up to about 25-35% by volume to provide the necessary void-space for expansion which occurs on rubblizing the shale in the retort. The mined shale from an in situ retort is usually processed at the surface.

Both types of retorting processes produce wastewater. The water comes from dehydration of shale (i.e., mineral dehydration), water or steam injection into the retort, intrusion from groundwater into an in situ retort, and combustion. The retort wastewater is contaminated with inorganic and organic matter. The organic matter is a mixture of one or more of pyrolytic kerogen or retort shale oil products. The organic content of the water can be as high as a few percent. The retort wastewater must be at least partially cleaned or purified before it can be disposed of, consistent with environmental requirements. More importantly, many areas, where abundant accessible oil shale deposits are found are arid areas where water shortage requires at least partial purification.

Purification by prior art methods have not met with success. Prior art methods normally use biodegradation for removal of a significant amount of organic compounds, particularly complex mixtures of organic compounds which are also mixed with inorganic compounds. Retort water is intensely colored, contains large quantities of tarry materials, surface active agents, heterocycles (mostly nitrogenous), malodorous compounds, and is generally alkaline in pH because it contains inorganic and organic bases. Color bodies intereferre with colorimetric assay. Tarry materials foul filtering devices and equipment generally. Surface active agents cause foaming and emulsion formation which are frequently very stable. Heterocycles and alkanes are not readily oxidized and many compounds, particularly nitrogen heterocycles, are biorefractory and malodorous. Oil shale retort wastewaters contain sufficient bases that they are normally too high in pH (i.e., above 8) for microorganisms found advantageous for treatment of contaminated water. Retort wastewaters contain bases providing a high pH and enough alkalinity (i.e., buffering) that acid neutralization is not practical. It is highly desirous and, in fact, essential to the development of a shale oil industry to provide a purification process for oil shale retort wastewater.

It is therefore a principal object of the present invention to provide a process for removing biorefractory and odoriferous compounds from water containing same.

Another object is to provide a process for purifying oil shale retort wastewater containing biorefractory and odoriferous compounds.

Still another object of this invention is to provide a process for purifying water which maximally uses known, established technology overall.

A specific object of this invention is to provide a process for removing biorefractory and odoriferous compounds in a facile and economic fashion.

Yet another object is to conserve water by providing a process which removes compounds resistant to conventional purification methods.

Another object of the invention is to conserve useful organic matter such as the products of pyrolyzed kerogen from retort wastewater.

Other objects and advantages of the present invention will become apparent from the description herein taken as a whole.

SUMMARY OF THE INVENTION

Process for removing biorefractory compounds from water containing same comprising contacting said water with raw or virgin oil shale at ambient conditions which include a temperature above freezing and separating said water and oil shale.

Preferably, the raw shale is activated or pretreated with a compound of aqueous-organic miscibility and selected from carboxylic acids, alcohols, adehydes, ketones, ethers, amines, amides, sulfoxides, mixed ether-esters, and nitriles.

DESCRIPTION OF THE PREFERRED EMBODIMENTS

In order to facilitate the understanding of the present invention and the full scope thereof, the theory or mechanism of the invention will be set forth, although it is to be fully understood that the invention as described and claimed herein is not bound thereto. The present disclosure teaches one skilled in the art how to practice the invention without regard to the accuracy of the theory found therein.

Raw oil shale has characteristics of reverse-phase chromatographic packing material. The efficiency of solute removal from contact of an aqueous wastewater phase with the immobilized kerogen, it is believed, depends on the hydrophobicity of the solutes and on the intimacy of contact of the hydrophilic mobile phase with the hydrophobic stationary kerogen. Although these two phases of unlike polarities have no propensity for intermingling, the wetting or "activation" of the kerogen with a solvent that is mutually miscible can greatly enhance contact and, therefore, the partitioning of solute from the aqueous to kerogen phase. The hydrophobic solute removal capacity of shale increases with increasing content of kerogen.

The contacting of the contaminated water with the raw oil shale is not particularly critical and can be carried out using any number of known or conventional techniques. For example, the fragmented oil shale can be slurried or otherwise washed in the wastewater to be treated at any ambient conditions provided the temperature is above freezing (i.e., freezing point of the water, that is, about 0° C. or 32° F.). The generally preferred and more efficient manner of treatment of the wastewater is to pass it through a column of the fragmented oil shale.

Before proceeding with further discussion of the details of the process, it is pointed out that the term raw or virgin oil shale as used herein includes activated raw oil shale unless expressly stated or is apparent from context. For brevity in some cases the oil shale may be referred to as oil shale or shale. It is to be understood, unless otherwise indicated or is apparent, to mean raw oil shale.

The term extraction or treatment is used herein to apply to the phenomenon that when raw oil shale and retort wastewater are brought into contact with each other certain components in the wastewater partition into and become attached to the shale and are removed from the water.

The term fragmented oil shale as used herein is intended to include, unless expressly stated or is otherwise apparent from context, a wide range from large chunks of several inches in dimension to fine powders on the order of about 100 mesh or less. Thus, fragmented raw oil shale means large pieces obtained from mining the oil shale or granular material obtained by pulverizing or coarse grinding, or still finer particulated oil shale obtained by fine grinding or milling into a powder. The smaller the fragmentation of oil shale, the greater the expense involved. Accordingly, in the practice of this invention, the degree of fragmentation must be balanced against cost and other considerations.

One important consideration in regard to the degree of fragmentation is that the extraction efficiency of the raw oil shale in removing contaminants and particularly biorefractory compounds is the surface area of the oil shale. Thus, efficiency of the raw oil shale, all else being equal, correlates directly with the surface area. Accordingly, as a general rule, the smaller the shale size the better. The oil shale, however, could be subsequently processed to recover shale oil from it. A particular size of shale will be preferred for the recovery operation. It is, therefore, seen that fragmentation of the shale for water purification into pieces or particles smaller than for retorting will be performed only when justified by the economics and/or critical needs of the purification. However, it is to be remembered also that shale ground too fine presents problems in retorting, for example, generation of excess heat and fusing of the shale. It is contemplated that the quantities of contaminated water produced in retorting oil shale will normally not require that the raw oil shale be fragmented smaller for surface area to adequately remove the biorefractory compounds produced than for good retorting operation.

In operating a continuous water purification process, one convenient manner is to have several columns of raw oil shale properly manifolded and valved so that when one column reaches breakthrough, the flow can be directed to a fresh column of raw shale. Breakthrough can be readily determined by colorimetric assay, or other automated continuous or substantially continuous analysis known in the art such as gas-liquid chromatography, high-performance liquid chromatography or infrared analysis.

Although the extraction process is preferably operated at ambient conditions (i.e., above freezing), it can be operated at temperatures above and below about 20°–25° C. Elevated temperatures, for example, about 85° C. (185° F.) can be used with certain advantages in some cases, particularly where retort water is used before cooling. As temperature increases substantially, dissolution of the oil shale's kerogen in the activating agent increases, and solubility of the hydrophobic wastewater contaminants increases in the aqueous phase; neither of these effects is desired. Also the pressure can be subatmospheric or slightly superatmospheric. Higher pressures having some advantage in certain cases to reduce volatilization of activating agent and possibly other compounds, but a slight positive pressure is usually necessary to overcome headloss in a continuous-flow column operation.

The contaminated water can be extracted by passing through a vertical column in a gravity-fed trickling-type operation or upwards so that the column is essentially fluid filled in the voids between the shale packing and the vessel. The latter method provides for longer contact of the wastewater with the shale solids and maximizes the vessel's capacity and the shale solids as an active purifying component in the extraction.

The raw oil shale activation agents as previously mentioned include carboxylic acids, alcohols, aldehydes, ethers, ketones, amides, sulfoxides, amines, mixed ether-esters such as the Cellosolves (available from Union Carbide Corp.), and nitriles. Preferred compounds are alkyl alcohols of up to about 6 carbon atoms, aryl alcohols of 6 carbons, aldehydes up to 2 carbons, ethers of about 4 carbon atoms, ketones of 3 to about 4 carbon atoms, sulfoxides of 2 carbons, amides of 3 carbons, cyclic amines of up to 6 carbons, carboxylic acids of 1 to about 4 carbon atoms, mixed ether-esters of up to about 8 carbon atoms, and acetonitrile.

Examples of the activating agents are:
Alcohols: methanol, ethanol, 1- and 2-propanol, and phenol.
Aldehydes: formaldehyde and acetaldehyde.
Ethers: tetrahydrofuran and dioxane.
Ketones: acetone and methyl ethyl ketone.
Carboxylic Acids: formic acid, acetic acid, and propionic acid.
Sulfoxides: dimethyl sulfoxide.
Amides: N, N-dimethyl formamide.
Amines: pyridine.
Nitriles: acetonitrile.
Mixed Ether-Esters: Cellosolve acetate, methyl Cellosolve acetate, butyl Cellosolve acetate and hexyl Cellosolve acetate.

The preferred activating agents involve the lower alcohols, aromatic ethers, and oxides, such as methanol, tetrahydrofuran, and dimethyl sulfoxide.

Activation of the raw shale is carried out by washing with, immersing, or soaking the fragmented oil shale in the activating fluid. The washing can be conveniently carried out by passing the activating agent like methanol through a column of fragmented shale at ambient conditions. Temperatures below or above about 20°–25° C. can be used but except as they may be slightly above ambient normally have no advantages. Slightly elevated temperatures will achieve faster activation, but as temperature increases substantially, dissolution of the oil shale's kerogen in the activating agent increases and this is generally not desired.

As mentioned hereinabove, the treatment of the contaminated water with raw oil shale does not remove all the impurities or contaminants. It does, however, remove the biorefractory and malodorous compounds. In retort wastewaters this is primarily heterocyclic nitrogen compounds which also are the less polar hydrophobic compounds on a relative basis. The more polar compounds pass through the shale with the water. The compounds extracted tend to be the more hydrophobic in nature. The more polar hydrophilic compounds, such as fatty acids that remain in the water, can then be removed by means such as biodegradation using conventional means.

A mixture of bacteria can be selectively enriched from soil extract and activated sludge to grow aerobically on retort water organic solutes as a sole source of carbon and energy at a temperature of ambient to 30° C.; addition of trace nutrients, such as phosphate and magnesium, allow for most complete growth. These acclimated organisms work quite well for additional treatment of water according to the present invention. These acclimated microorganism generally belong to the metabolically-versatile genus of Pseudomonas.

The wastewater can be treated with microorganisms for biodegradation either before or after extraction with the shale. However, because of the basicity of the wastewater it must be first treated to reduce the pH from a typical pH on the order of about 8 to 9.5 to a more microorganism-compatible pH of about 6 to 8. The pH is best reduced in the practice of this invention by steam or air stripping in descending order of preference. Neutralization with mineral acids is not entirely suitable because the buffering capacity of the $NH_3$ and carbonate species requires extensive acid addition. Also, mineral acid neutralization produces significant solids in neutralizing the basicity due to precipitation of inorganic sulfur contaminants (i.e., elemental sulfur) and fatty acids. The stripping can follow the extraction with shale where the biodegradation follows the extraction but as indicated must precede the biodegradation step.

Where the biodegradation step precedes the extraction with shale, all or substantially all of the cells must be removed before the extraction operation. Unless the cells are removed they will plug the bed of shale preventing continuous high flows of feed water and treated water. Removal of cells can be by any of the various known methods, such as gravity sedimentation-clarification for flocculent cells, or by centrifugation or filtration for cells of dispersive growth.

Once the wastewater has been stripped, biodegraded, and extracted, it is relatively pure but by no means potable. Further purification if any depends on the contemplated usage for the water. A substantial portion of retort wastewater is needed for dust control and for forming a cementitious mass or compaction of the spent shale in its disposal. In most cases for this use, further purification is not needed. However, where further purification is desired or needed the water effluent from the stripping, biodegradation, and raw shale extraction operation can be conveniently further purified in a municipal water treating plant or the equivalent.

The raw oil shale used in the extraction can be regenerated by elution with a small amount of activating solvent or it can be fed to a retort and the organic matter recovered. The biorefractory material acquired from treating the water will not concentrate so as to cause problems in recovering the kerogen or shale oil from that shale. The shale containing kerogen plus extract is fed to a retort and recovered in conventional fashion. Some of the biorefractory material obtained by extraction will be structurally modified by retort conditions (e.g., temperature) to biodegradable material. However, the biorefractory and malodorous compounds present or formed in the retort will be recovered as a liquid as part of the shale oil and processed in conventional fashion. The biorefractory and malodorous compounds are the hetero compounds and primarily heterocyclics. More specifically, they are to a large extent the heterocyclic nitrogen, sulfur and oxygen compounds. Such compounds are customarily removed in conventional petroleum refining by hydrotreating in the presence of a catalyst which is both active for that purpose and resistant to poisoning by same. In those cases where the biorefractories are present in relative amounts to require significant process changes (e.g., greater hydrogen feed, lower flow rates, etc.) this can be minimized if not obviated by blending the shale oil containing such large amounts of heterocompounds.

While particular embodiments of the invention have been described, it will be understood, of course, that the invention is not limited thereto, since many modifications may be made; and it is therefore contemplated to cover by the appended claims any such modifications as fall within the true spirit and scope of the invention.

I claim:

1. A process for removing biorefractory compounds from contaminated water comprising contacting said water with fragmented raw oil shale at ambient conditions which include a temperature above freezing.

2. A process according to claim 1 wherein the contaminated water is wastewater produced by an oil shale retort.

3. A process according to claim 1 wherein the temperature is elevated up to about 185° F.

4. A process according to claim 1 wherein the raw oil shale is fragmented to a size varying from pieces which are several inches in dimension to particles of about 100 mesh.

5. A process according to claim 1 wherein the process is conducted by passing said wastewater vertically upward through a column of fragmented shale.

6. A process according to claim 1 wherein the raw oil shale is preactivated before contacting the wastewater with an activating agent.

7. A process according to claim 6 wherein the activating agent is selected from carboxylic acids, alcohols, aldehydes, ketones, ethers, amines, amides, sulfoxides, mixed ether-esters, and nitriles.

8. A process according to claim 6 wherein the activating agent is selected from the group consisting of alkyl alcohols of up to about 6 carbon atoms, aryl alcohols of 6 carbon atoms, aldehydes of up to 2 carbon atoms, ethers of up to about 4 carbon atoms, ketones of 3 to 4 carbon atoms, carboxylic acids of 1 to about 4 carbon atoms, sulfoxides of 2 carbon atoms, amides of 3 carbon atoms, cyclic amines of up to 6 carbon atoms, mixed ether-esters of about 8 carbon atoms, and acetonitrile.

9. A process of purifying wastewater from an oil shale retort and recovering shale oil therefrom comprising:

stripping the wastewater to remove gases such as ammonia, subjecting the stripped wastewater to biodegradation to remove biodegradable compounds, removing the cells following the biodegradation step, contacting wastewater from an oil shale retort with fragmented raw oil shale at a temperature of above freezing, to remove the biorefractory compounds, said process being further characterized in that said stripping step must precede the biodegradation step.

10. A process according to claim 9 wherein the temperature is elevated up to about 185° F.

11. A process according to claim 9 wherein the raw oil shale is fragmented to a size varying from pieces which are several inches in dimension to particles of about 100 mesh.

12. A process according to claim 9 wherein the raw oil shale is preactivated, before contacting the wastewater, with an activating agent.

13. A process according to claim 12 wherein the activating agent is selected from carboxylic acids, alcohols, aldehydes, ketones, ethers, amines, amides, sulfoxides, mixed ether-esters, and nitriles.

14. A process according to claim 12 wherein the activating agent is selected from the group consisting of alkyl alcohols of up to about 6 carbon atoms, aryl alcohols of 6 carbon atoms, aldehydes of up to 2 carbon atoms, ethers of up to about 4 carbon atoms, ketones of 3 to 4 carbon atoms, carboxylic acids of 1 to about 4 carbon atoms, sufloxides of 2 carbon atoms, amides of 3 carbon atoms, cyclic amines of up to 6 carbon atoms, mixed ether-esters of about 8 carbon atoms, and acetonitrile.

15. A process according to claim 9 wherein said stripping is carried out with steam.

16. A process according to claim 9 wherein the biodegradation is carried out at ambient conditions above freezing with microorganisms obtained by selectively enriching soil extract and activated sludge.

17. A process according to claim 9 wherein the wastewater is further purified by treatment in a municipal water treatment type process.

18. A process according to claim 9 wherein the enumerated steps are carried out in the general sequence set forth therein.

* * * * *